United States Patent [19]

Workman, Jr.

[11] Patent Number: 4,474,279

[45] Date of Patent: Oct. 2, 1984

[54] SAFETY SHUT-OFF FOR SWING BAR TOOLS

[75] Inventor: William Workman, Jr., Spring Lake, Mich.

[73] Assignee: Cooper Industries, Inc., Houston, Tex.

[21] Appl. No.: 391,872

[22] Filed: Jun. 24, 1982

[51] Int. Cl.[3] .............................................. F16D 43/20

[52] U.S. Cl. .................................... 192/150; 173/12; 81/370

[58] Field of Search ................ 192/3 R, 1, 3 N, 18 A, 192/144, 150; 173/12, 169; 81/370, 369

[56] References Cited

U.S. PATENT DOCUMENTS

| | | | |
|---|---|---|---|
| 2,893,278 | 7/1959 | Rice . | |
| 3,507,173 | 4/1970 | Wallace . | |
| 3,812,744 | 5/1974 | Westerberg . | |
| 4,004,859 | 1/1977 | Borries . | |
| 4,064,771 | 12/1977 | Krieg . | |
| 4,113,080 | 9/1978 | Thackston et al. . | |
| 4,418,764 | 12/1983 | Mizobe | 192/150 X |
| 4,429,775 | 2/1984 | Teramoto | 192/150 X |

*Primary Examiner*—George H. Krizmanich
*Attorney, Agent, or Firm*—Finnegan Henderson Farabow Garrett & Dunner

[57] ABSTRACT

A safety shut off mechanism for a fluid-powered motor comprises a reaction torque structure tending the rotate in a direction opposite to the direction of rotation of the motor under load a swing-bar for normally restraining the reaction torque structure against rotation, a reference structure for providing a point of reference as to movement of the reaction torque structure, a locking structure actuated by fluid pressure for locking the reference structure against rotation, a retaining structure tending to retain the reaction torque structure and the reference structure in a predetermined orientation relative to each other, and a shut-off structure for depriving the motor of the motive force of the fluid in response to relative movement between the reaction torque structure and the reference structure upon failure of the swing-bar.

9 Claims, 8 Drawing Figures

SAFETY SHUT-OFF FOR SWING BAR TOOLS

BACKGROUND OF THE INVENTION

1. Field of the Invention

This invention relates to shut-off mechanisms for hand-held pneumatic power tools, and more particularly to a safety shut-off for such tools when the related reaction torque absorption mechanism malfunctions.

2. Description of the Prior Art

The resistance encountered by a workpiece driven by a pneumatic-powered motor is commonly termed the reaction torque. In heavy duty, hand-held pneumatic power tools it is usually necessary to incorporate some mechanism either to prevent the reaction torque of the power tool from exceeding a predetermined level, or to absorb the reaction torque. In devices for preventing the reaction torque from exceeding a given level, specific clutch-type mechanisms have been developed for shutting off the fluid to the motor when a predetermined torque value applied to the workpiece is attained.

Many applications of heavy duty, hand-held pneumatic power tools require a high level of torque, and therefore high levels of reaction torque are generated. A so-called "swing-bar" is often employed to absorb these high levels of reaction torque. One end of the swing-bar, usually an elongated rigid bar, is so incorporated into the tool as to receive the reaction torque which occurs when the workpiece encounters resistance to the torque applied by the motor. The other end of the swing-bar is lodged against an immovable surface for preventing revolution of the swing-bar about the tool during the operation of the tool. The swing-bar thereby cooperates with the immovable surface to absorb the reaction torque.

If, during the operation of the tool, the swing-bar is improperly lodged against the immovable surface, or the swing-bar should break, the tool operator is in danger of being struck by the dislodged or broken swing-bar. At the very least, the sudden unrestricted reaction torque may jerk the tool out of the operator's hands. The prior art fails to disclose a satisfactory fail-safe mechanism for instantaneously shutting off the fluid to a hand-held pneumatic tool of the swing-bar type in case the swing-bar fails to function for any reason while torque is being applied to a workpiece.

SUMMARY OF THE INVENTION

It is therefore the principal object of this invention to provide a safety shut-off mechanism for pneumatically operated hand-held power tools for substantially instantaneously diverting power from the motor when the reaction torque absorption device, such as a swing-bar, malfunctions for any reason.

The principal object of this invention is accomplished by a safety shut-off mechanism for a fluid-powered motor used to power a tool operating on a workpiece, comprising, reaction torque means tending to rotate in a direction opposite to the direction of rotation of the motor under load, i.e., when resistance is encountered by the workpiece, reaction torque absorption means for normally restraining the reaction torque means against rotation, reference means for providing a point of reference as to movement of the reaction torque means, means actuated by fluid pressure for locking the reference means against rotation, means tending to retain the reaction torque means and the reference means in a predetermined orientation relative to one another, shut-off means for depriving the motor of the motive force of the fluid in response to relative movement between the reaction torque means and the reference means upon failure of the reaction torque absorption means.

The reaction torque means is preferably two structures tending to rotate together as a unit when fluid is supplied to the motor under load. One structure, the upper end plate, preferably is a member with a disk at the base supporting a cylindrical section of narrower diameter than the disk. A central aperture extends axially through the cylindrical and disk sections of the upper end plate. Inside the cylindrical portion are two needle bearings for supporting the end of the rotor shaft. As known in the art, the upper end plate is provided with standard features to pressurize the rotor blades upon start-up of the motor, to permit pressurized fluid to flow to the motor and to prevent fluid from pressurizing the rotor shaft. The second structure preferably comprising the reaction torque means is the motor housing. The motor housing is a generally cylindrical member surrounding the upper end plate and having a surface perpendicular to the cylindrical axis with two diametrically opposite apertures near the edge of the perpendicular surface and a stop pin axially extending from the perpendicular surface near one of the two apertures. As known in the art, the motor housing is provided with features to permit pressurized fluid to flow to the motor and exhaust fluid to escape from the motor.

In an alternative embodiment of the present invention suitable for a reversible motor, the reaction torque means is preferably three structures tending to rotate together as a unit when fluid is supplied to the motor under load, the upper end plate, the spacer stack-up and the motor housing. The disk portion of the upper end plate in the reversible embodiment preferably contains two pickle-shaped slots near the disk edge. The cylindrical section of the upper end plate has two cams. As known in the art, the upper end plate is provided with standard features to pressurize the rotor blades upon start-up of the motor, to permit pressurized fluid to flow to the motor and to prevent fluid from pressurizing the rotor shaft. The spacer stack-up is preferably a cylinderical member equal in diameter to the cylindrical portion of the upper end plate and having passages as known in the art for permitting the flow of pressurized fluid to the motor. The motor housing is preferably a cylindrical member having standard features as known in the art for permitting pressurized fluid to flow to the motor and exhaust fluid to escape from the motor, and having circumferential grooves in the exterior surface for forming cams designed to cooperate with O-rings to oppose rotation of the motor housing relative to the pistol grip housing when fluid is supplied to the motor.

The reaction torque absorption means is preferably a rigid bar, commonly termed a swing-bar, and is connected to the reaction torque means via the gear case and motor housing as known in the art, the opposite end normally resting against an immovable surface for absorbing the reaction torque and restraining the reaction torque means in a stationary position.

The reference means may comprise a shut-off disk in one embodiment of the invention suitable for non-reversible fluid powered motors. The shut-off disk is preferably a rotatable disk member of substantially the same diameter as the motor housing comprising the reaction torque means and having a circumferential groove. The shut-off disk has two diametrically opposite cradle structures holding solid spherical structures and is rotatably mounted on one end of the motor housing, the other end of the shut-off disk becoming fixed to the pistol grip housing by locking means.

In an alternative embodiment of the present invention suitable for a reversible motor, the reference means preferably comprises three structures rotating together as one unit, a reversing disk, a reversing shaft and a reversing knob. The reversing disk is also essentially a disk-like structure having a central circular aperture and a cylindrical extension aligned with the aperture wide enough to permit the reversing disk to be rotatably mounted about the cylindrical extension of the upper end plate so that the disk portions of the reversing disk and the upper end plate are slidably engaged during relative rotation between the upper end plate and the reversing disk. Two pickle-shaped slots separated by an angular separation of approximately 100° extend axially through the disk near the disk edge. Extending radially from the circular central aperture to the disk edge on the side diametrically opposite the mid-point of the 100° separation between the two pickle slots is a cylindrical channel for housing a spring-loaded detent. The reversing shaft is essentially a rod having a channel extending longitudinally through the center of the rod and diametrically near both ends of the central longitudinal channel. The reversing knob is a disk-like cap having an axially located central circular bore extending approximately half the depth of the knob. A diametrical channel extends from the central bore through the knob on either side of the central bore.

The locking means is preferably either an O-ring brake and cam mechanism, the latter comprising a circumferential groove on the outside diameter of the shut-off disk and the surface of the inside diameter of the pistol grip housing, or, in an alternative embodiment suitable for a reversible motor, a locking pawl slidably situated in a cylindrical channel extending radially from a point about halfway between the central axis of the reversing knob to the outside diameter of the reversing knob. The locking means only becomes operative when fluid is supplied through the fluid inlet of the pistol grip housing.

The retaining means is preferably either a torsion spring with one end rigidly inserted into a notch in the shut-off disk and the other end resting in a groove in the motor housing, or, in an alternative embodiment suitable for a reversible motor, two cams located about 43° apart on the outside diameter of the cylindrical portion of the upper end plate and a spring-loaded detent pin rigidly positioned on the inside diameter of the reversing disk for interacting selectively with the cams in the upper end plate during operation of the tool.

The shut-off means may include two ball valves diametrically positioned in the shut-off disk and two axially extending inlet ports for motive fluid diametrically positioned in the motor housing for responding to the coupled movement of the upper end plate and motor housing relative to the shut-off disk upon malfunction of the swing-bar by aligning the ball valves over the inlet ports to prevent fluid from rotating the motor. The shut-off means alternatively may include an upper end plate and a reversing valve, both structured as described hereinabove for the alternative embodiment of the reaction torque means and the reference means, respectively. Movement of the upper end plate relative to the reversing valve upon malfunction of the swing-bar positions the detent of the reversing valve halfway between the two cams in the cylindrical portion of the upper end plate and aligns the respective pickle-slots in the upper end plate and the reversing valve to prevent the motive fluid from rotating the motor as hereinafter fully described.

The accompanying drawings, which are incorporated in and constitute a part of this specification, illustrate at least one embodiment of the invention and together with the description, serve to explain the principles of the invention.

The objects, features, and advantages of the present invention will be made apparent by the following detailed description which makes reference to the accompanying drawings.

DESCRIPTION OF THE PREFERRED EMBODIMENTS

Figure 1:
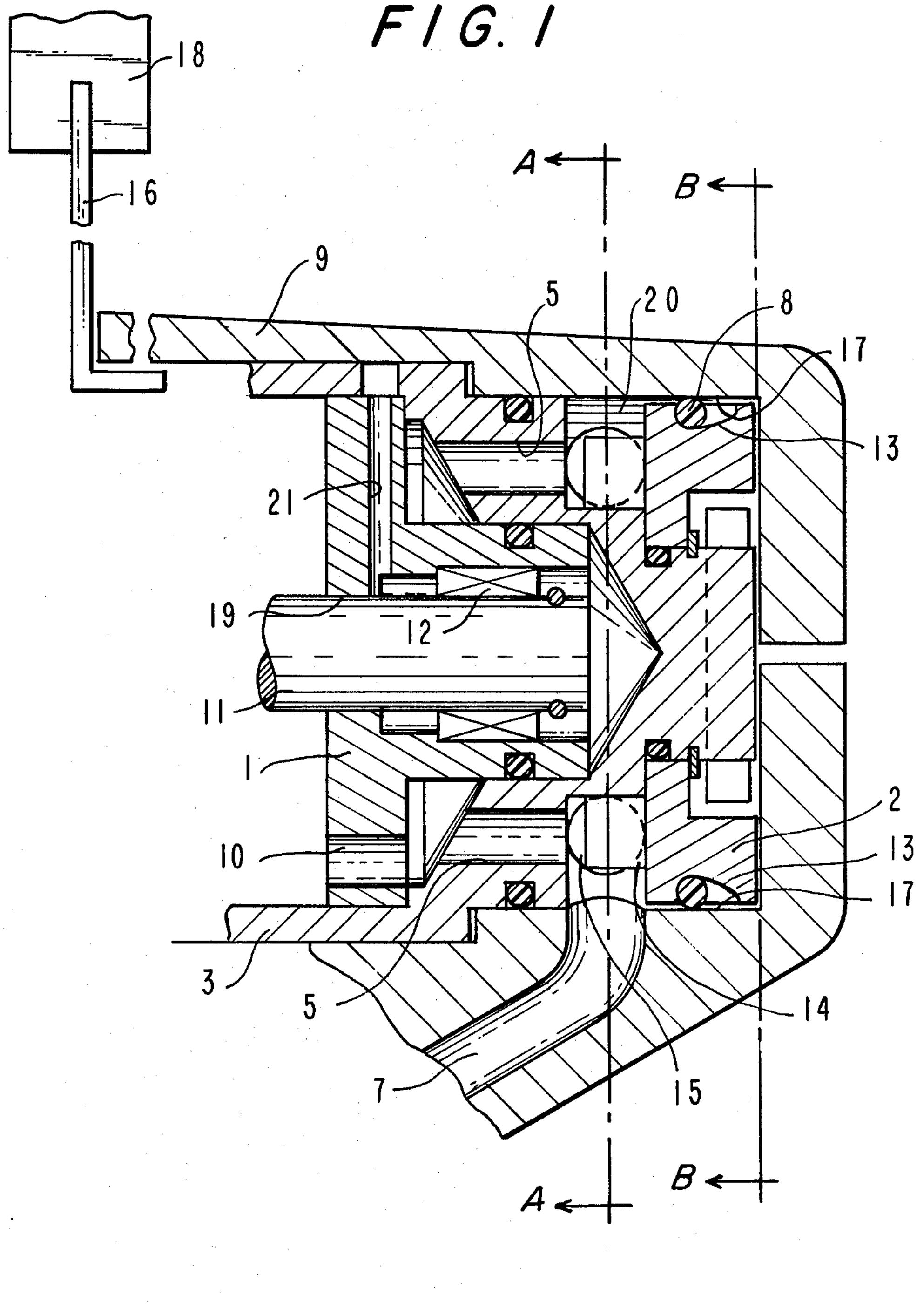
FIG. 1 is a cross-sectional view of an embodiment of the safety shut-off mechanism of the invention with particular utility to a non-reversible pneumatic motor.
Figure 2:
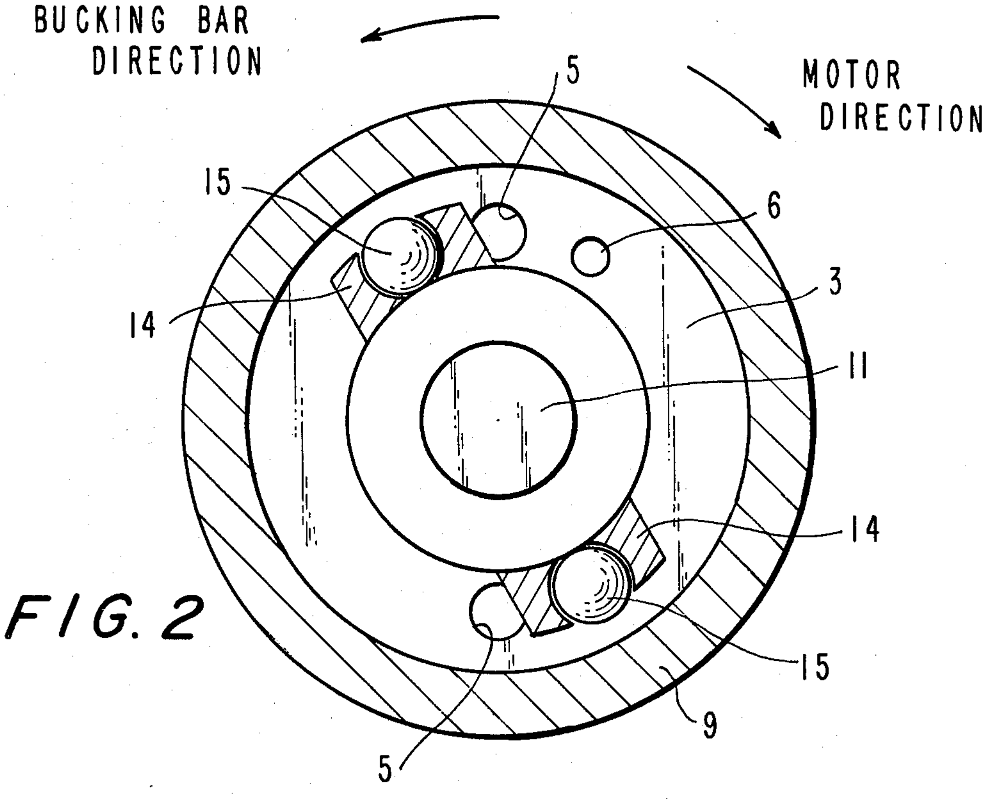
FIG. 2 is a cross-sectional view taken along the line A—A of FIG. 1.
Figure 3:
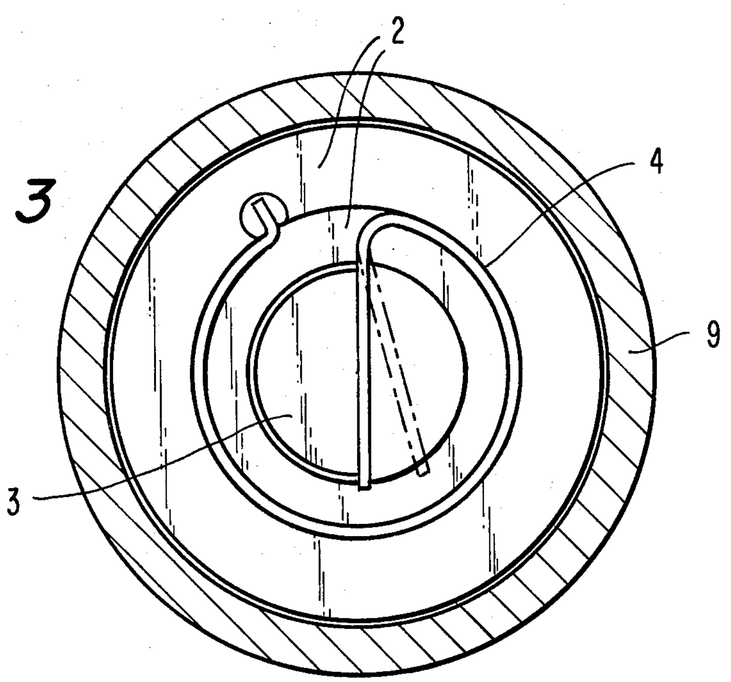
FIG. 3 is a cross-sectional view taken along the line B—B of FIG. 1.

FIGS. 1, 2 and 3 of the drawings illustrate an embodiment of the safety shut-off mechanism of the invention particularly useful for a non-reversible fluid-powered motor.

The safety shut-off mechanism of the invention is conveniently arranged in pistol grip housing 9 to the rear of the motor (not shown), the pertinent portion of the housing being broken away in FIG. 1.

In accordance with the invention, a reaction torque means is provided for tending to rotate in a direction opposite the rotational direction of the motor when the workpiece encounters resistance to the torque being applied by the motor. As here embodied, the reaction torque means comprises upper end plate 1 and motor housing 3 tending to rotate together as a unit when fluid is applied to rotate the motor under load. Upper end plate 1 comprises a disk portion having central axial aperture 19, shown in FIG. 1, and a cylindrical portion extending on one side of the disk portion and aligned with the aperture. Motor housing 3 comprises an essentially cylindrical member having two diametrically located inlet ports 5 extending in the same direction, i.e., axially, as the axis of rotation of rotor shaft 11 and providing a path to the motor for pressurized, i.e., motive, fluid. Upper end plate 1 and motor housing 3 are provided with features known in the art of air driven motors for pressurizing the rotor blades (not shown) upon start up of the motor, permitting pressurized fluid to flow to the motor and preventing fluid from pressurizing rotor shaft 11.

A reaction torque absorption means under normal operating conditions prevents upper end plate 1 and motor housing 3 from rotating when reaction torques are encountered by the workpiece. As embodied herein, the reaction torque absorption means is rigid swing-bar 16, sometimes called a bucking bar, rigidly attached via the gear case (not shown, but known in the art) and the motor housing, to the upper end plate on one end and lodged by the operator against immovable surface 18 on the other end when the tool is in use, as known in the art.

Rotor shaft 11, driven by the motor and usually an extension of the drive shaft, extends into the portion of the pistol grip housing 9 including the safety shut-off mechanism of the invention. Rotor shaft 11 is free to rotate relative to upper end plate 1, and is supported within the upper end plate member by bearings 12, for example needle bearings. Rotor shaft 11 rotates in the same direction as the motor. If not held stationary while the workpiece encounters resistance to the torque applied by the motor, i.e., when the motor is under load, the gear case (not shown, but attached on one end to the swing-bar and on the other end to the motor housing), motor housing 3 and upper end plate 1 will rotate as a unit in a direction opposite to that of shaft 11 and the motor.

Fluid inlet 7 passes through pistol grip housing 9 and communicates with inlet ports 5. Inlet 7 includes annular channel 20 formed between the inside wall of the pistol grip housing and the outside surface of the motor housing, permitting fluid to reach inlet ports 5 in any orientation of motor housing 3 and upper end plate 1, unless the shut-off mechanism, as hereinafter described, becomes operative.

In accordance with the invention, the safety shut-off mechanism includes reference means for providing a point of reference as to movement of the reaction torque means, i.e., motor housing 3 and upper end plate 1. As here embodied, the reference means comprises shut-off disk 2 rotatably mounted on motor housing 3 (FIG. 2), but locked against rotation when pressurized fluid is supplied through inlet 7. Shut-off disk 2 is preferably a rotatable disk member of substantially the same diameter as the internal diameter of the pistol grip housing and having a circumferential groove for receiving O-ring 8. Shut-off disk 2 is coupled to motor housing 3 by torsion spring 4 (FIG. 3), as hereinafter described, and will rotate with motor housing 3 unless shut-off disk 2 is locked against rotation.

In accordance with the invention, the safety shut-off mechanism includes means actuated by fluid pressure for locking the reference means against rotation. As embodied herein, the locking means fixes shut-off disk 2 to pistol grip housing 9 by wedging action caused by fluid pressure forcing O-ring 8 to wedge between inclined surface 13 and planar surface 17. Planar surface 17 is on the inner surface of pistol grip housing 9, and inclined surface 13 is part of the circumferential groove of the shut-off disk. Inclined surface 13 extends around the entire circumference of shut-off disk 2, and O-ring 8 is annular. The locking means is inoperative unless fluid pressure is applied through inlet 7. Thus, the position of shut-off disk 2 relative to pistol grip housing 9 can be reset along with motor housing 3 and upper end plate 1 so long as no fluid pressure is being applied through inlet 7.

When fluid is supplied through inlet 7, then O-ring 8, positioned between inclined surface 13 of shut-off disk 2 and planar surface 17 of pistol grip housing 9, is forced by the fluid pressure along the inclined surface and consequently forces shut-off disk 2 into frictional contact with pistol grip motor housing 9. The fluid then passes through ports 5, enters the rotor cylinder (not shown, but known is the art) through passage 10 and causes the motor to rotate in a clockwise direction, as shown in FIG. 2.

In accordance with the invention, the safety shut-off mechanism includes means tending to retain the reaction torque means and the reference means in a predetermined orientation relative to each other. As here embodied, the retaining means comprises torsion spring 4 having one end held by a notch in shut-off disk 2 and the other end resting in a groove in motor housing 3. Torsion spring 4 thus retains motor housing 3 and shut-off disk 2 in a predetermined orientation relative to one another.

In accordance with the invention, shut-off means are provided for depriving the motor of the motive force of the fluid in response to relative movement between the reaction torque means and the reference means upon malfunction of the reaction torque absorption means. As here embodied, the shut-off means comprises two diametrically positioned ball valve cradles 14 in shut-off disk 2 and solid sphere 15 in each cradle. During normal operation of the fluid-powered motor, shut-off disk 2 is oriented such that spheres 15 are held by torsion spring 4 in positions near, but not obstructing, inlet ports 5. However, movement of motor housing 3 with respect to the shut-off disk under the influence of the reaction torque will align inlet ports 5 with cradled spheres 15 and spheres 15 will be forced by the pressure of the fluid to seal off the flow of fluid from entering ports 5.

Stop pin 6 is rigidly attached to motor housing 3 for limiting the movement of the motor housing relative to the shut-off disk by abutting one of the cradles attached to the shut-off disk. The stop pin prevents misalignment of ports 5 and spheres 15 that would otherwise result from overtravel by the motor housing.

When the motor is operating, rotor shaft 11 and the motor both turn in the direction indicated in FIG. 2. The rotational direction of the reaction torque is opposite to the rotational direction of the motor. As known in the art, the reaction torque acts on swing-bar 16 in a rotational direction opposite to the rotational direction of the motor. However, rigid swing-bar 16 cannot rotate so long as it is properly lodged against an immovable surface.

The safety shut-off means becomes operative when swing-bar 16 either slips off the immovable surface, breaks or otherwise malfunctions. In the event of such malfunction, motor housing 3 rotates under the influence of the reaction torque against the tension of torsion spring 4 until ports 5 are aligned with spheres 15. This aligned position of spheres 15 and ports 5 is also the position at which stop pin 6 strikes cradle portion 14 of shut-off disk 2. In this manner, stop pin 6 prevents the motor housing from rotating past the position at which spheres 15 become aligned with ports 5.

Once ports 5 are aligned with spheres 15, spheres 15 act under the pressure of the fluid to seal off the flow of fluid through ports 5. This is the shut-off orientation of the shut-off disk and the motor housing.

In the shut-off orientation the fluid no longer supplies torque to the motor and the motor ceases rotating upon dissipation of its rotational inertia. This results in a concomitant reduction in reaction torque, until it too is completely dissipated. The rotational inertia of the motor is dissipated by the resistance encountered by rotor shaft 11 and by the internal friction generated by the rotating motor parts.

The fluid pressure in the motor holds the motor housing in the shut-off orientation until the fluid is vented by means of a start valve (known in the art, but not shown). When the trapped fluid is vented by means of the start valve, then the action of torsion spring 4 returns the motor housing to its normal position, illustrated in FIG. 2. The venting of the trapped fluid also frees O-ring 8 to move back along inclined surface 13 to disengage shut-off disk 2 and pistol grip housing 9.

FIGS. 4, 5, 6, 7, and 8 illustrate an embodiment of the safety shut-off mechanism of the invention suitable for a reversible fluid-powered motor.

Figure 5:
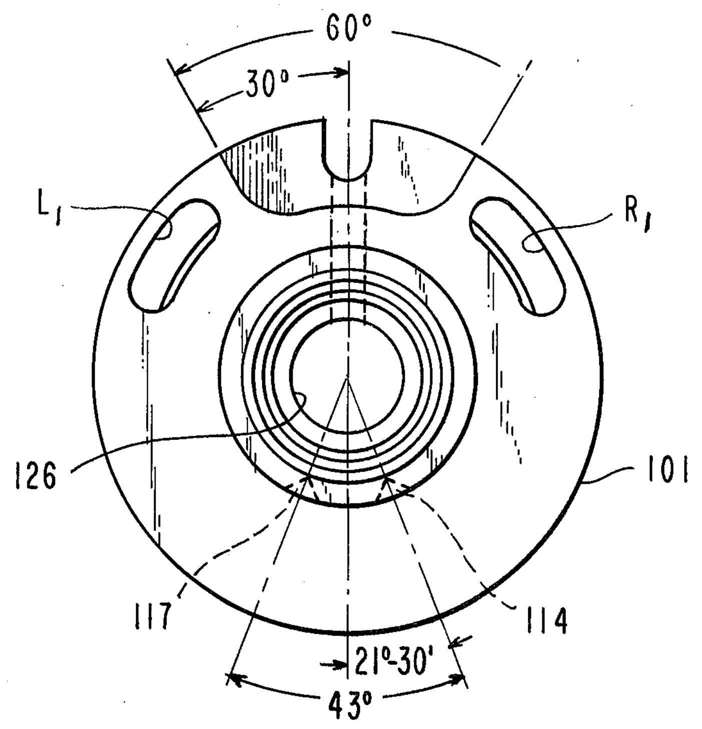
FIG. 5 is a view looking down on the upper end plate of FIG. 4 from the cylindrical side.

In this embodiment, the reaction torque means includes upper end plate 101, spacer stack-up 123 and motor housing 103. When fluid is supplied to the motor under load, plate 101, spacer 123 and housing 103 all tend to rotate together as one unit relative to pistol grip housing 109 and the motor. Upper end plate 101 is essentially a disk having central circular aperture 126 and a cylindrical extension aligned with the aperture on one side of the disk portion. The disk surface on the cylindrical side (as shown in FIG. 5) contains two pickle-shaped slots L1 and R1 (also referred to as ports L1 and R1, respectively) near the disk edge and separated by an acute angle. Two cams 117 and 114, spaced approximately 43° apart, are located on the outside surface of the cylindrically extending portion of upper end plate 101. As known in the art, upper end plate 101 is provided with features for pressurizing the rotor blades (not shown) upon start-up and preventing pressurized fluid from pressurizing rotor shaft 11. Spacer stack-up 123 is essentially a cylinder of approximately equal diameter to the cylindrical portion of upper end plate 101 and having cut-out sections as known in the art for permitting fluid to flow to the motor. Motor housing 103 is also an essentially cylindrical member having cut-out sections as known in the art for permitting pressurized fluid to flow to the motor, exhaust fluid to escape the motor and circumferential grooves in the exterior surface for forming cams designed to cooperate with O-rings to oppose rotation of housing 103 relative to pistol grip housing 109 when pressurized fluid is supplied through inlet 107.

Figure 4:
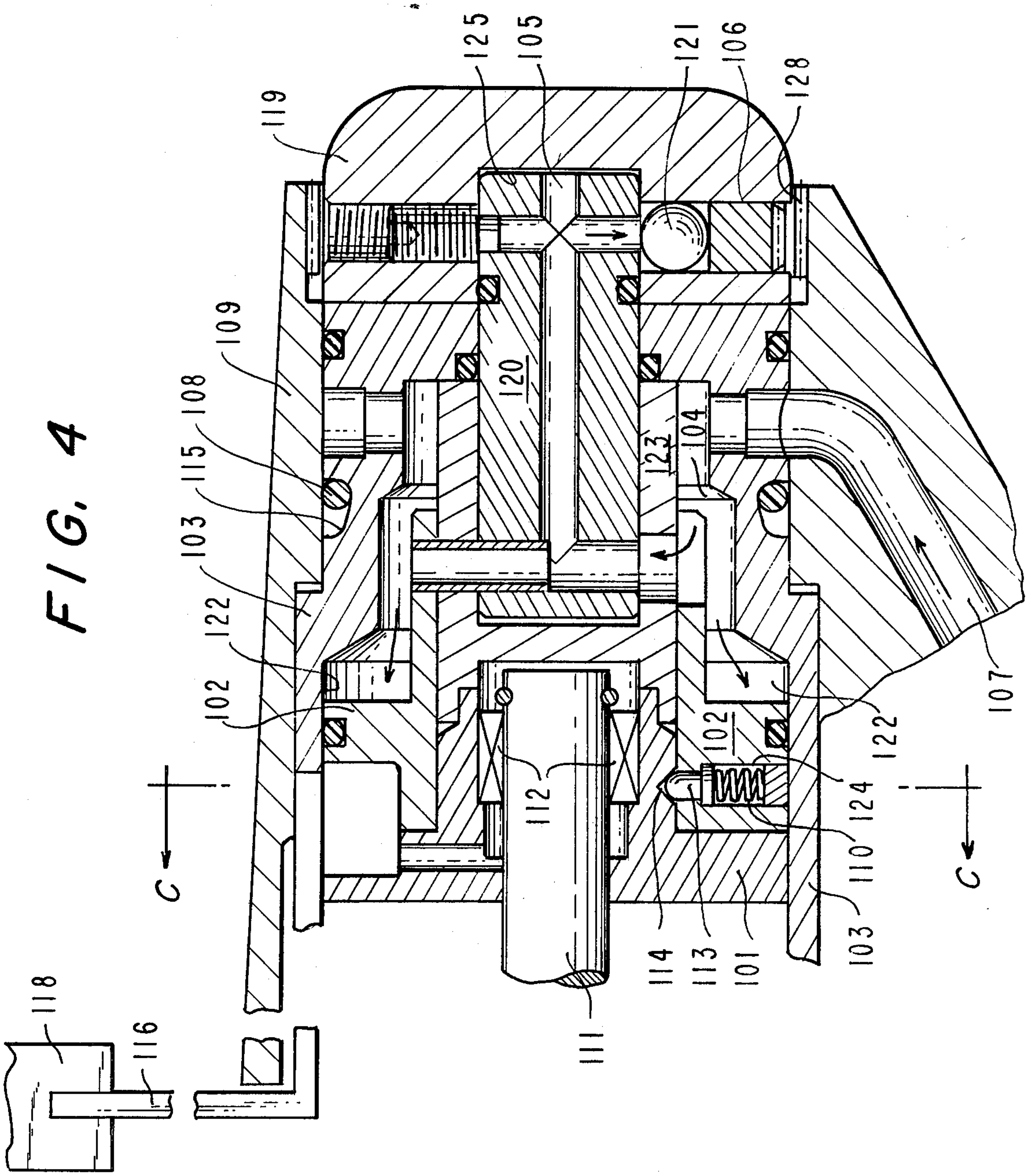
FIG. 4 is a cross-sectional view of a second embodiment of the safety shut-off mechanism of the present invention with particular utility to a reversible air-powered motor used to drive a hand-held power tool.
Figure 6:
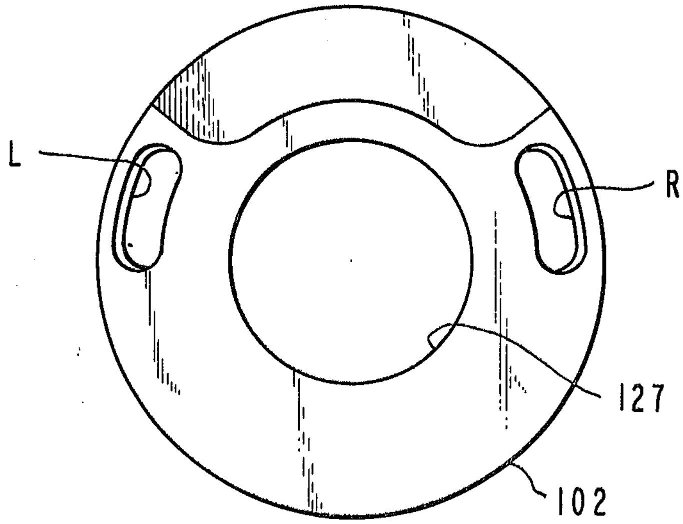
FIG. 6 is a view looking up at the reversing disk of FIG. 4 from the side opposide the cylindrical side.

As here embodied for utility in the reversible fluid-powered motor, the reference means includes a reversing disk 102, reversing shaft 120 and reversing knob 119. Reversing disk 102 (as shown in FIGS. 4, and 6) is also essentially a disk having central circular aperture 127 and a cylindrical extension aligned atop the aperture. Aperture 127 is just large enough to permit reversing disk 102 to be rotatably mounted around the cylindrical extension of upper end plate 101 so that the disk portions of reversing disk 102 and upper end plate 101 are slidably engaged during relative rotation between the upper end plate and the reversing disk. Pickle slots L2 and R2 (also referred to as ports L2 and R2, respectively) extend axially through the disk near the disk edge and are separated by an angle of approximately 104°. Extending from circular aperture 127 radially to the disk edge is channel 124 for holding detent 110. When fluid is not being supplied to inlet 107, reversing valve 102 is free to rotate within motor housing 103. Reversing shaft 120 is a rod having channel 105 comprising a central axial channel with a radially extending branch channel near both ends of the central axial channel. Reversing knob 119 is a disk-like cap having axially located central circular bore 125 extending approximately half the depth of the disk for insertion of one end of reversing shaft 120. Two cylindrical channels extend radially from central bore 125 to the outside surface of the disk on opposite sides of the central bore.

Figure 7:
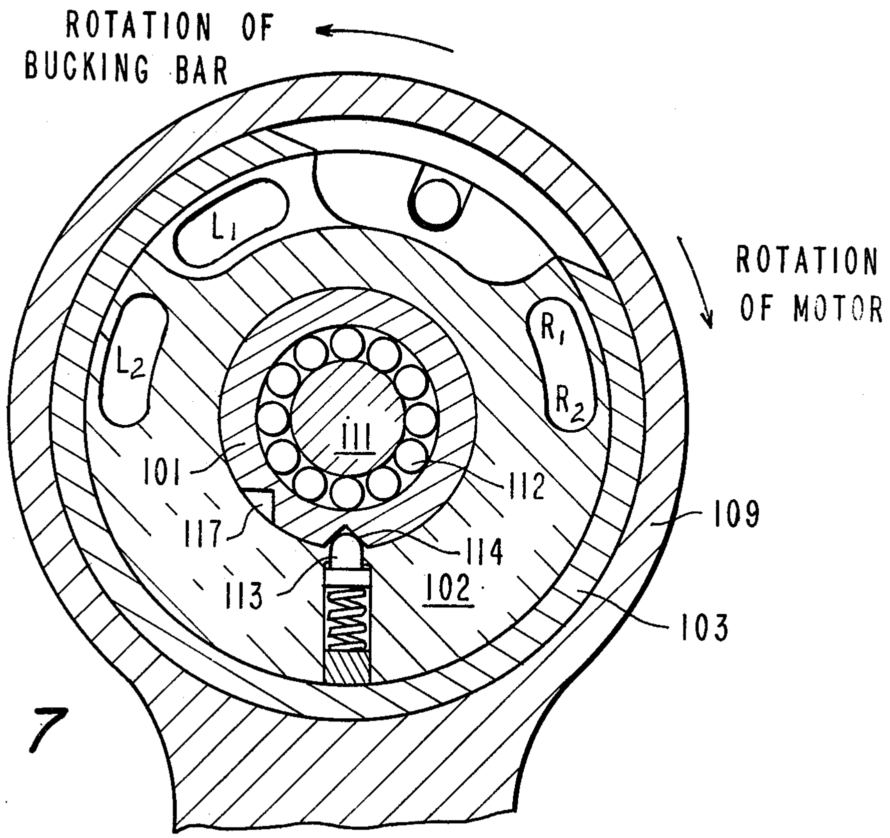
FIG. 7 is a cross-sectional view taken along the line A—A of FIG. 4 with the motor running.

In accordance with the invention, fluid pressure activated means is provided for locking reversing knob 119 against rotation. As here embodied, the locking means comprises sphere 121 and pawl 106 contained in the larger diametered of two cylindrical channels radially extending from central bore 125. When fluid is supplied through inlet port 107 (as shown in FIG. 7), the fluid travels to cavity 104 and then through passage 105 to apply fluid pressure to sphere 121 and locking pawl 106 so that the pawl is inserted into cam 128 in pistol grip housing 109 to lock in positive fashion reversing knob 119 to pistol grip housing 109.

Rotor shaft 111 is supported within upper end plate 101 by bearings 112, preferably needle bearings. Shaft 111 rotates freely on bearings 112. Subject to the braking action of O-ring 108, upper end plate 101 rotates freely within motor housing 103 when fluid is not supplied through inlet 107. Upper end plate 101 is rigidly connected to swing-bar 116 via spacer stack-up 123, motor housing 103 and the gear case (not shown, but known in the art and connected on one end to the motor housing and on the other end to the swing-bar).

The fluid path in the reversible embodiment begins at inlet 107 in pistol grip housing 109. The pressurized fluid flows to channel 104, formed between motor housing 103 and spacer stack-up 123. From channel 104, fluid flows to annular chamber 122, formed between the inside wall of motor housing 103 and the outer wall of reversing disk 102. From annular chamber 122, the pressurized fluid fills ports L2 and R2 of the reversing disk, and, depending upon the relative position of reversing disk 102 and upper end plate 101 (as fully explained hereinafter) passes through either port R1, L1 or both R1 and L1, and then enters the rotor cylinder (not shown, but known in the art of fluid powered motors) to cause, respectively, clockwise rotation, counterclockwise rotation or non-rotation of the motor.

Ports L2 and R2 permit fluid flow through reversing disk 102. Port L2 is not diametrically opposite port R2. Ports L1 and R1 permit fluid to pass through upper end plate 101. Ports L1 and R1 are not diametrically opposite. The smallest angular distance between ports L1 and R1 is less than the smallest angular distance between ports L2 and R2. The relative orientation of the four fluid ports, R1, R2, L1, and L2, determines whether the motor is stopped, running in the clockwise direction, or running in the counterclockwise direction, as explained hereinafter.

The relative alignment of ports L2 and R2 with respect to ports L1 and R1 is dependent upon the relative position of reversing disk 102 with respect to upper end plate 101. The relative alignment of the fluid ports for clockwise motor rotation is illustrated in FIG. 7. Port R2 is aligned with port R1 and port L2 is blocked, resulting in clockwise motor rotation. Port L1 permits secondary exhaust, i.e., back pressure from the turning rotor blades (not shown), to escape from the motor. Pin 113 in member 102 engages notch 114 in member 101 to maintain members 101 and 102 in the proper relative orientation for clockwise motor operation.

In order to effect counterclockwise rotation of rotor shaft 111, members 101 and 102 are shifted by manually turning reversing knob 119, connected via reversing shaft 120 to reversing disk 102, until pin 113 engages notch 117 so that port L2 is aligned with port L1. Port R2 is blocked and port R1 permits secondary exhaust to escape from the motor. Pin 113 engages notch 117 to hold members 101 and 102 in position for counterclockwise rotation of shaft 111.

Figure 8:
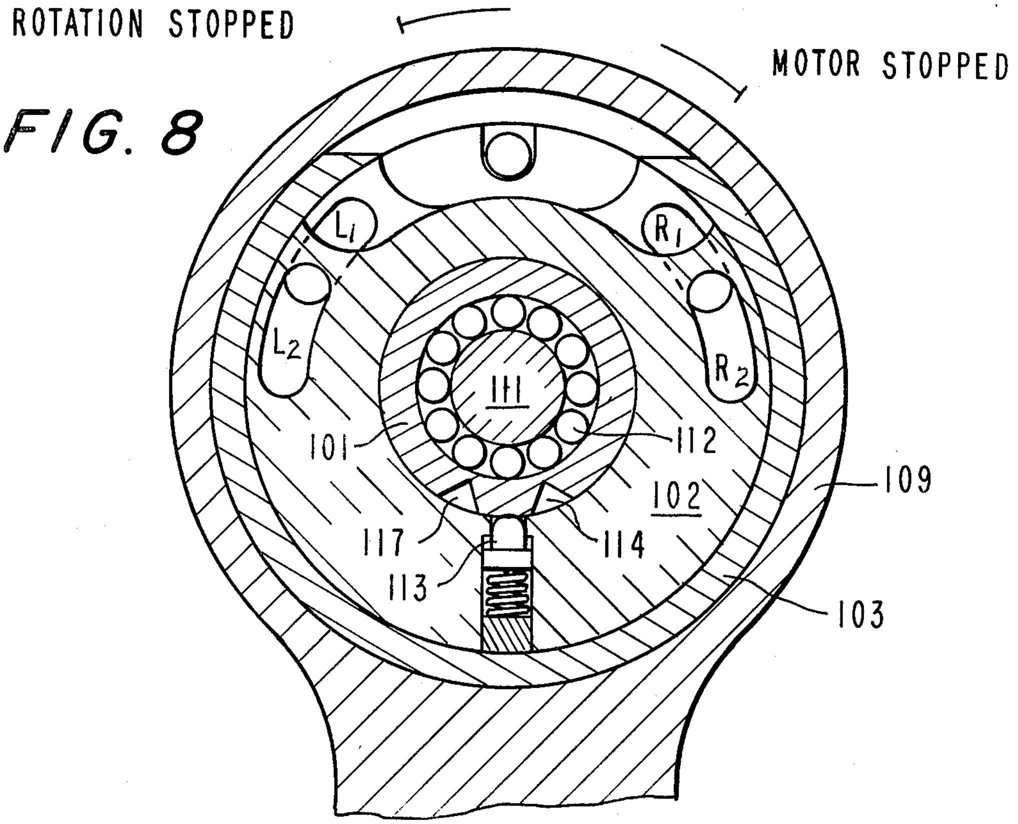
FIG. 8 is a cross-sectional view taken along the line A—A of FIG. 4 with the motor stopped.

During the normal clockwise rotational operation of the fluid-powered motor, rigid swing-bar 116 remains stationary against immovable surface 118. If swing-bar 116 is stationary, then upper end plate 101 is also stationary, since swing-bar 116 and upper end plate 101 rotate together as one unit via space stack-up 123, motor housing 103 and the gear case (not shown), as known in the art. If swing-bar 116 should slip from its stationary position, break or otherwise malfunction, then the reaction torque generated by the resistance encountered by the workpiece will cause upper end plate 101 to rotate in a direction opposite to the rotational direction of shaft 111. The rotation of upper end plate 101 is slowed somewhat by a breaking action caused by air pressure forcing O-ring 108 to be wedged between the cam surface 115, and the inside surface of pistol grip housing 109. It will be recalled that motor housing 103, spacer stack-up 123 and upper end plate 101 all rotate together as a unit. Rotation of upper end plate 101 causes a shift in the relative position of members 101 and 102 which tends to cause an alteration in the alignments of ports L1 with L2 and R1 with R2. For example, if the malfunction occurs during clockwise motor rotation, then ports L1 and L2 would rotate toward each other and ports R1 and R2 would rotate away from each other. Spring-loaded detent pin 113 is displaced from notch 114 and is moved toward notch 117. When upper end plate 101 rotates through an angle of about 22° relative to reversing disk 102, the alignment of port L2 with respect to port L1 and port R2 with respect to port R1 is such that equal amounts of pressurized fluid enter the left and right sides of the motor and thus there is no fluid pressure drop across the motor. The relative position of members 101 and 102 in this condition is shown in FIG. 8. Since there is no dynamic fluid pressure differential across the motor, the motor stalls and therefore no torque is applied to the motor or to the workpiece (not shown). Since no torque is applied to the workpiece, the workpiece no longer generates any reaction torque capable of rotating swing-bar 116 in a manner potentially dangerous to the tool operator.

What is claimed is:

1. A safety shut-off mechanism for a fluid-powered motor comprising:
- reaction torque means tending to rotate in a direction opposite to the direction of rotation of said motor under load;
- reaction torque absorption means for normally restraining said reaction torque means against rotation;
- reference means for providing a point of reference as to movement of said reaction torque means;
- means actuated by fluid pressure for locking said reference means against rotation;
- means tending to retain the reaction torque means and the reference means in a predetermined orientation relative to each other;
- shut-off means for depriving the motor of the motive force of the fluid in response to relative movement between the reaction torque means and the reference means upon failure of the reaction torque absorption means.

2. A device as in claim 1 wherein the reaction torque absorption means comprises a bar rigidly attached at one end to the reaction torque means, the opposite end for normally resting against an immovable surface for restraining said reaction torque means in a stationary position.

3. A device as in claim 1 wherein said locking means includes a motor housing and a cam mechanism operating in response to fluid pressure to lock the reference means to the motor housing.

4. A device as in claim 3 wherein the cam mechanism includes a planar surface on the inside wall of the motor housing, an inclined surface on the reference means adjacent said planar surface, and an O-ring brake slidably positioned between said planar surface and said inclined surface, said O-ring being advanced along said inclined surface by said fluid pressure.

5. A device as in claim 1 wherein the retaining means includes a detent and cam.

6. A device as in claim 1 wherein the retaining means includes a spring and a stop pin.

7. A device as in claim 1 wherein the shut-off means comprises two ball valves diametrically positioned as part of the reference means and two fluid inlet ports diametrically positioned as part of the reaction torque means for responding to the movement of the reaction torque means relative to the reference means upon malfunction of the reaction torque absorption means by aligning said ball valves over said inlet ports to prevent fluid from rotating the motor.

8. A device as in claim 1 including:
- two coaxial rotatable apertured means, each apertured means having two apertures, one apertured means having two cams and the other apertured means having a detent interacting with one of said cams to retain said cammed apertured means in one of two manually determinable angular orientations relative to the other apertured means, the first of said angular orientations causing clockwise rotation of said motor and the second of said angular orientations causing counterclockwise rotation of said motor, wherein the shut-off means includes a third relative orientation of said coaxial apertured means, halfway between said first and said second orientations, for preventing fluid from rotating said motor.

9. A safety shut-off mechanism for a fluid-powered motor comprising:
- a motor housing;
- fluid supply means;
- a variable fluid path permitting fluid to flow from the fluid supply means to rotate the motor;
- reaction torque means for tending to rotate in a direction opposite to the direction of rotation of the motor under load;
- reference means for providing a point of reference for the movement of said reaction torque means; and
- means actuated by fluid pressure for locking the reference means to the motor housing;
- wherein movement of the reaction torque means relative to the locked reference means causes an alteration in the variable fluid path for depriving the motor of the motive force of the fluid.

* * * * *